(12) United States Patent
Ray et al.

(10) Patent No.: US 8,150,113 B2
(45) Date of Patent: Apr. 3, 2012

(54) METHOD FOR LUNG LESION LOCATION IDENTIFICATION

(75) Inventors: Lawrence A. Ray, Rochester, NY (US); Richard A. Simon, Rochester, NY (US); Henry Nicponski, Albion, NY (US); Edward B. Gindele, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 1077 days.

(21) Appl. No.: 12/018,247

(22) Filed: Jan. 23, 2008

(65) Prior Publication Data

US 2009/0185731 A1    Jul. 23, 2009

(51) Int. Cl.
*G06K 9/30* (2006.01)
*G06K 9/34* (2006.01)

(52) U.S. Cl. ........ 382/128; 382/129; 382/130; 382/131; 382/132; 382/173; 382/177; 382/180; 382/228; 128/920; 128/922; 128/923

(58) Field of Classification Search .................. 382/128, 382/129, 130, 131, 132, 173, 177, 180, 228; 128/920, 922, 923
See application file for complete search history.

(56) References Cited

U.S. PATENT DOCUMENTS

| 2004/0258285 A1* | 12/2004 | Hansen et al. ................. 382/128 |
| 2008/0188962 A1* | 8/2008 | Suryanarayanan et al. .... 700/89 |
| 2009/0252395 A1* | 10/2009 | Chan et al. .................... 382/131 |

OTHER PUBLICATIONS

Richard A. Simon et al., "Analyzing Lesions in a Medical Digital Image", U.S. Appl. No. 11/567,867, filed Dec. 7, 2006.
X. Zhou, et al., "Automatic segmentation and recognition of anatomical structures from high-resolution CT images," Computerized Medical Imaging and Graphics, vol. 30, pp. 299-313, 2006.
F. Frangi, et al., "Multiscale vessel enhancement filtering," in W. Wells, A. Colchester, and S. Delp, editors, MICCAI'98, vol. 1496 of LNCS, pp. 130-137. Springer-Verlag, Germany, 1998.
T. Deschamps, et. al., "Vessel segmentation and blood flow simulation using Level-sets and Embedded methods," International Congress Series 1268, pp. 75-80, 2004.

(Continued)

*Primary Examiner* — Phillip A Johnston
*Assistant Examiner* — Nicole Ippolito

(57) ABSTRACT

A method and a system are disclosed for labeling an anatomical point associated with a lesion in an organ such as a lung. The method includes: a segmentation of a vessel tree anatomical structure starting from an autonomously determined initial image point; labeling the vessel segments of the vessel tree segmentation with segment labels based on a priori anatomical knowledge, thereby creating an individualized anatomical model; receiving a user-specified image point having a location from a user and locating a nearby vessel structure; tracking along the vessel structure in a direction towards a root of a parent vessel tree until a prior labeled vessel segment is encountered in the anatomical model, and assigning the label of the encountered prior labeled vessel segment from the anatomical model as an anatomical location label of the user-specified image point.

17 Claims, 7 Drawing Sheets

OTHER PUBLICATIONS

Juerg Tschirren, et al., "Intrathoracic Airway Trees: Segmentation and Airway Morphology Analysis From Low-Dose CT Scans," IEEE Trans. Medical Imaging, 24(12), 1529-1539, 2005.

Tschirren, Juerg, et al., "Matching and Anatomical Labeling of Human Airway Tree", IEEE Trans. Medical Imaging, 24(12), pp. 1540-1547.

Kitasaka, T., et. al., "Automated Extraction of Aorta and Pulmonary Artery in Mediastinum form 3D Chest X-ray CT Images without Contrast Mediuam," SPIE Medical Imaging 2002, vol. 4684, pp. 1496-1507.

Cohen, L. and Kimmel, R. "Global Minimum for Active Contour Models: A minimal path approach." International Journal of Computer Vision, vol. 24, No. 1 , pp. 57-78, Aug. 1997.

Sedgewick, Algorithms in C, third edition, Addison-Wesley, 1998, pp. 187-250.

C. Min Ma and Milan Sonka, "A Fully Parallel 3D Thinning Algorithm and Its Applications", *Computer Vision and Image Understanding*, 64(3), pp. 420-433, 1996.

\* cited by examiner

METHOD FOR LUNG LESION LOCATION IDENTIFICATION

FIELD OF THE INVENTION

The embodiments of the present invention relate to the field of digital imaging, and more particularly to processing a 3D digital medical image to identify and report the location of an anatomical object.

BACKGROUND OF THE INVENTION

Identification of potentially cancerous lesions in CT and MRI studies is a common task of radiologists. Once such a lesion has been identified, it is desirable to determine information pertaining to the lesion, such as the extent and the volume such a lesion occupies and other descriptors. The radiologist's report documents the findings of the examination. Part of this report contains the location of the lesion and this is usually reported relative to anatomical structures or landmarks. The use of anatomical landmarks is preferred as the basic anatomy is common to all patients and is independent of the particular examination conducted.

The visual interpretation of the examination by the radiologist can be done in conjunction with other aids, such as computer assisted diagnosis (CAD) software, but the radiologist makes the final interpretative decisions. Once a radiologist has determined a lesion represents an abnormal condition and is to be noted, it is possible for automated image processing tools to estimate information about the lesion, such as the volume it occupies. A common method is for the radiologist to initiate the tools by pointing to the lesion with a mouse or similar pointing device. The results, such as the volume, need to be included in a report.

A further important descriptor of a lesion consists of its location in the body. Typically, location will be specified by reference to anatomical structure or structure sub-division. A distinct and standard system of nomenclature may be associated with different lesion types and different organs or systems in the human body. For example, the location of lesions in the lungs will typically be specified with identification of the left or right lung and the lung lobe in which the lesion resides. Lesions in the liver can be located with respect to a standard classification system for the liver lobes, or with respect to the branching hierarchy of the portal vein network.

The example of a lesion located in one of the lungs illustrates the type of specific locating terminology that might be used in a medical report. For the purpose of the description herein, the terms lung lesion and lung nodule are synonymous and should be considered interchangeable. The two lungs are usually comprised hierarchically of five lobes, three lobes on the right-hand side and two on the left-hand side. Each lobe comprises an independent unit from the viewpoints of function and anatomical structure. Thus, each lobe receives a distinct main branch of the pulmonary arterial and venous circulation, as well as of the airways of the bronchial tree. The lobes are also spatially distinct, with the two lobes on the left side being an upper and lower lobe and the three lobes on the right side forming an upper, middle and lower region.

The hierarchical structure of the lung lobes is reflected in the branching, tree-like architecture of the pulmonary vasculature and bronchial airways. The pulmonary arteries form a tree structure with the root of the tree being the right ventricle of the heart. The vessel tree enters the lungs in the central thoracic region called the mediastinum. Two branches of the tree supply depleted blood to the left-hand side of the lungs and three branches supply the right-hand side. The five main branches of the pulmonary arteries determine the five lobes of the lung. The arteries continue to divide into vessels with smaller diameters in order eventually to perfuse the alveolar structures in the lung with an ample supply of blood to be cleansed of waste gases and infused with oxygen. The bronchial structure of the lung is similar and runs parallel to the vascular structure. A demarcation of the lobes is sometimes visible in the CT examination as a faint line, called a fissure. In addition, sometimes the lobes of the lung are further defined into anterior or posterior locations within the lobe. The more refined the description, the easier it is for a subsequent radiologist or clinician to relocate the lesion noted.

It is desirable for the radiologist to point to the lesion and have the information about the lesion and the location of the lesion to be automatically reported into the patient report. Requiring the radiologist to transcribe the results for placement into the report is a source of error and also requires additional time. For this reason, it is desirous to report the location of the lesion automatically and in terms commonly used. However, the automatic reporting of the lesion location must perform the task at least as fast as manual methods. If processing times are longer than the manual approach, then the advantage of the automatic method is lost and the automatic approach becomes impractical.

One method to determine the lobe containing a lesion is to segment the lungs into five zones and determine the zone in which the lesion is located. A number of methods to accomplish this task exist. For example, see X. Zhou, et al, "Automatic segmentation and recognition of anatomical structures from high-resolution CT images," Computerized Medical Imaging and Graphics, Vol. 30, pp. 299-313, 2006. However, these methods require significant computational resources and are inefficient. To perform lung lobe segmentation, all the lung voxels are classified according to the lobe to which they belong. However, to identify the lobar location of a lung lesion, there is only a need to perform the labeling for a single or small number of voxels at the location of the lesion, and so the additional labeling effort is not utilized. The embodiments of this invention are intended to address the problem of identifying the lung lobe of a specific voxel and not the lobar segmentation of the entire lung. While in theory the method would produce complete lung lobar labeling, it would however lead to an inferior result in terms of overall computational efficiency.

Both the vascular and bronchial structures of the lungs take the form of a tubular vessel tree branching network. Means of identifying tubular structures are well-known (see F. Frangi, et al., "Multiscale vessel enhancement filtering," in W. Wells, A. Colchester, and S. Delp, editors, MICCAI'98, volume 1496 of LNCS, pages 130-137. Springer-Verlag, Germany, 1998). These describe a tubular structure in mathematical terms and utilize the form and structure of the associated Hessian matrix of the CT image data. One result of the analysis of a potential tubular structure is a measure, commonly referred to as vesselness. Variations on the general notion of vesselness have been proposed, though in general all the variations utilize the eigenvalues and eigenvectors of the Hessian matrix in some manner. We recognize a voxel can be identified as being part of a tubular structure using these methods. However, the methods also require considerable computational resources and a wholesale use of such a measure throughout a CT examination is impractical.

Understanding the hierarchical structure and branching relationships of the vessels in a vasculature tree has been the object of many research efforts. One method of vessel segmentation and tracking is based upon a fast marching method, which is allied to level-set methods (see T. Deschamps, et. al., "Vessel segmentation and blood flow simulation using Levelsets and Embedded methods," International Congress Series 1268, pp. 75-80, 2004.) A different method of vessel tracking relies on the recursive application of an adaptive segmentation algorithm in a cylindrical neighborhood that follows down the branching structure of the vessel tree (see Juerg Tschirren, et al., "Intrathoracic Airway Trees Segmentation and Airway Morphology Analysis From Low-Dose CT Scans," IEEE Trans. Medical Imaging, 24(12), 1529-1539, 2005.). This method has the advantage of building up incremental knowledge of the tree structure in a breadth-first (level by level) order, so that the branching position and level are known at any point during the tracking process. Thus, the tracking can be terminated when a desired level or a desired set of a priori known anatomically-important vessels have been tracked. Furthermore, the method can be highly adaptive, as the changing characteristics of the local cylindrical neighborhood can be used to adjust tracking strategies and algorithm parameters.

Using these methods to perform a segmentation of the entire vascular structure is impractical in terms of computational cost. This impracticality can result in an inefficient use of computational resources and longer processing times, and more importantly in ineffective use of the radiologist time. Furthermore, since vessel tree structures inherently decrease in physical dimension as they undergo repeated subdivision, and due to the finite imaging resolution used during any medical imaging collection, the accuracy and reliability of the vessel tracking must correspondingly diminish as the tree structure is tracked to finer and finer structural levels. Therefore, it would be desirable to confine vessel tracking for purposes of anatomical understanding and labeling to the initial tree levels (i.e., those closest to the root of the tree) in order to ensure maximum possible reliability.

We understand tracking and segmenting part of a vessel tree structure can form a basis for anatomical labeling. Labeling of anatomical structures consists of associating to them standard names that have agreed meaning in the medical community of interest. For example, branches of the human lung airway system can be labeled trachea, right main bronchus, left main bronchus, etc. Often such a labeling step requires that matching be performed between vessel segments actually found in a medical image of interest and the segments in a preconfigured model or set of models that represent the anatomical forms that can be found in the human population (see Tschirren, Juerg, et al., "Matching and Anatomical Labeling of Human Airway Tree", IEEE Trans. Medical Imaging, 24(12), pp 1540-1547). Anatomical labeling must exhibit tolerance to possible errors in the segmentation process and ambiguities in the range of available matches. Segmentation errors include, for example, spurious vessel branches due to slight vessel boundary deformations caused by image noise and artifacts, missing vessel segments, and missing branches. Matching errors or ambiguities can arise as a result of segmentation errors and also as a result of normal or abnormal anatomical variations in the human population. The difficulties encountered in the task of anatomical labeling provide further motivation to construct an automated labeling system that makes use of only the most reliable autonomously identified anatomical features. The embodiments of the current invention provide a solution to these difficulties. It makes use of a bi-directional vessel tracking strategy that confines anatomic-label matching to those parts of anatomy where it can be performed with the highest accuracy. Tracking of small and hence low-reliability vessels does not involve labeling or matching against an anatomy model. Rather, such tracking is employed solely to find a connection between reliably labeled anatomy and anonymous anatomy of the same vessel tree system. Some human anatomical organs are associated with more than a single vessel tree structure. Due to the nature of the systemic and pulmonary circulations, organs are supplied with parallel systems of arterial and venous blood-containing vessel trees. In the lungs, the bronchial airway tree provides yet a third distributional system whose anatomical form assumes that of a vessel tree. With a view towards the goal of automated location labeling of lesions, and with acknowledgement of the inherent tendency of medical image understanding algorithms to encounter failure situations, advantage can be had of the parallelism of the coterminous vessel tree structures. Thus, it would be most advantageous to first attempt to identify and segment the most reliably identifiable vessel tree structure and then perform lesion localization based on that structure. This strategy can be employed whenever it is the case that the parallel vessel trees are each associated in a predictable way with the organ's natural subdivisions, so that a clinically meaningful location label can result from any of the trees.

In the specific case of the lung and of CT imagery, the major branches of the bronchial tree can usually be reliably segmented and identified due to the high imaging contrast between the air-filled bronchial lumen and the surrounding bronchial wall, as well as the large size of the structures involved. For these reasons, we have determined recourse should first be had to using the bronchial vessel tree as an anatomical frame of reference for location identification. However, there may arise circumstances in which the use of the bronchial tree cannot successfully localize a lesion, most likely due to difficulty in tracing back from the lesion to the main bronchi, as described below, or due to pulmonary disease. In this case, a second attempt can be made at localization using the pulmonary arterial vessel tree. (In the case of CT and MRI imaging studies using contrast-enhancing injections into the blood stream, the arterial vessel tree will typically exhibit higher image contrast, and hence will enable more reliable automated segmentation, than will the pulmonary venous vessel tree.) Segmentation of the pulmonary tree can be accomplished by locating organs such as the pulmonary artery and the aorta (see Kitasaka, T., et. al., "Automated Extraction of Aorta and Pulmonary Artery in Mediastinum form 3D Chest X-ray CT Images without Contrast Mediuam," SPIE Medical Imaging 2002, Vol. 4684, pp. 1496-1507.) Finally, should the use of the arterial tree also fail, a final attempt can be made to localize the lesion using the pulmonary venous vessel tree. Thus, an aspect of the advantages of the embodiments of the present invention over the current art resides in the ability to take advantage of the existence of inherent anatomical parallelism in the servicing vessel trees of human organs.

Alternatively, by referencing the feature to the branching structure of multiple hierarchical vessel trees, the location of an anatomical feature of interest, such as a lesion, may be identified separately and independently. Operating in this way permits advantage to be taken of the positional redundancy of the trees from the information-content point of view. Use of multiple trees, either automatically or under explicit control of an operator, can be used to increase the accuracy of localization and confidence in the result. Thus, an advantage of the embodiments of the present invention is to provide higher accuracy location information than is available in the current art.

Methods to track vessels have been investigated by numerous researchers and implementations of vessel tracking are part of many commercially available PACS systems. A common method for vessel tracking utilizes a so-called fast marching method. The fundamental idea is to use properties of vessels within the CT image stack as the basis to establish a tracking strategy. One such strategy is to consider a connected volume V, such as the lung, and suppose there is a function referred to as the potential function $C: V \rightarrow \Re^+$ and furthermore suppose there are two points of the volume, $p_0$ and $p_1$ that are in the vascular system. Since V is connected there are an infinite number of smooth contours that connect $p_0$ and $p_1$. Some of these paths are preferable to others, and if the points $p_0$ and $p_1$ are in the vascular system, such a preferable path is one that follows the vascular system. If $\Omega$ is a contour connecting the points, it is often possible to parameterize $\Omega$ as a function $\omega:[0,s] \rightarrow V$ such that $\omega(0)=p_0$, $\omega(s)=p_1$, and $\|\omega'(\bullet)\|=1$. It is reasonable to assign for such a path a value, referred to as the path energy, by $$\int_0^s C(\omega(t))dt.$$

It is reasonable to find such a path that has minimal path energy. A method to determine such a path in digital systems, such as a medical image, can be formulated in terms of a so-called fast marching method (see Cohen, L. and Kimmel, R. "Global Minimum for Active Contour Models: A minimal path approach." International Journal of Computer Vision, vol. 24, No. 1, pp 57-78, August 1997).

The background information provided in the preceding paragraphs has contained special reference to the anatomy and structures of the lungs, and the localization of potential disease lesions in the lungs. The specifics of anatomical location specification will differ when the body site differs. Lesions in the human liver can be located with respect to a system of surface lobes (left, right, caudate, and quadrate anatomical lobes) based on gross surface anatomy, or a system of functional lobes and segments based on the branching structure of the hepatic and portal veins.

The embodiments of the current invention have application in the cases when anatomical locations are specified primarily with respect to the hierarchical structure of a branching tree of vessels. Examples include, in the human being, the lungs, liver, kidneys, brain, and heart myocardium. The embodiments of the invention also have application in the field of veterinary medicine, in which the anatomical structures of many vertebrate animals possess similarities to homologous structures in human beings, and hence vessel tree structures are available for location identification. The embodiments of the invention apply to anatomical vessel trees of different types, including arterial and venous blood vessel trees, lymph trees, and airway trees.

Automatic report generation is common in many "Picture Archiving and Communications System" (PACS) used in many radiology departments, such as the Carestream PACS system from Carestream Health, Inc. The report generators accumulate data from many sources, both manual and automatic and assemble the data in a standard fashion that saves time for the radiologist as well producing a report that is easy for clinicians and other radiologist to find pertinent information. A software application that identifies anatomical location containing the lesion of interest, according to a standard nomenclature system, is one of the data sources for such a system.

The embodiments of the present invention approach this problem by using methods that overcome these limitations. The invention is an ensemble of methods, where each is increasingly sophisticated, but requires more computational resources. All of these methods use the boundary of the leading edge of an expanding segmentation front that is likely to be part of the normal anatomy and finds a surface that holds this boundary fixed.

SUMMARY OF THE INVENTION

It is an object of the present invention to ascertain identification of an organ subdivision or sub-structure containing a specified object of interest rapidly and automatically, using knowledge of normal anatomy. Furthermore it is an object of the present invention to have the location included in a report that is automatically generated.

The above objects can be attained by the methods and systems disclosed for labeling an anatomical location associated with a lesion in an organ such as a lung. The methods and systems include vessel tree segmentation to create an anatomical model, and mapping using vessel connectivity from a user-specified image point to an anatomical label in the anatomical model. The vessel tree segmentation includes tracing a vessel tree from the tree root through a plurality of branch segments guided by anatomical knowledge. This segmentation further involves transforming image pixels using a threshold and examining image slices one slice at a time until a location and size of a connected component match anatomical knowledge criteria in order to identify the root of the vessel tree; then creating a binary recursive tree starting from the root having a predetermined number of bifurcations, by examining image slices one slice at a time and growing a vessel segment responsive to known anatomical vessel dimensions. The segmentation also includes labeling of the segments according to anatomical knowledge by creating a tree graph from thin skeletons of the vessel segments and labeling segment branches of the graph. Vessel tree segmentation can be applied to a plurality of vessel trees associated with a specific organ. Mapping using vessel connectivity from a user-specified image point to an anatomical label using an anatomical model includes labeling a specified image point with the label of an anatomically labeled vessel segment of the model. The mapping further includes randomly searching near the image point until a vessel is found, tracing the vessel to each type of anatomical model until a labeled vessel segment is found in the anatomical model, determining the type of anatomical model resulting in the least costly path from the image point to the root and creating a report record correlating the specified image point to the label of the labeled vessel segment first encountered on the least costly path. The user-specified image point labeling may further include comparing vessel segment labels resulting from a plurality of anatomical models for different vessel types for an organ and selecting the vessel segment label for the most reliable vessel type when the vessel segment labels are not identical.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
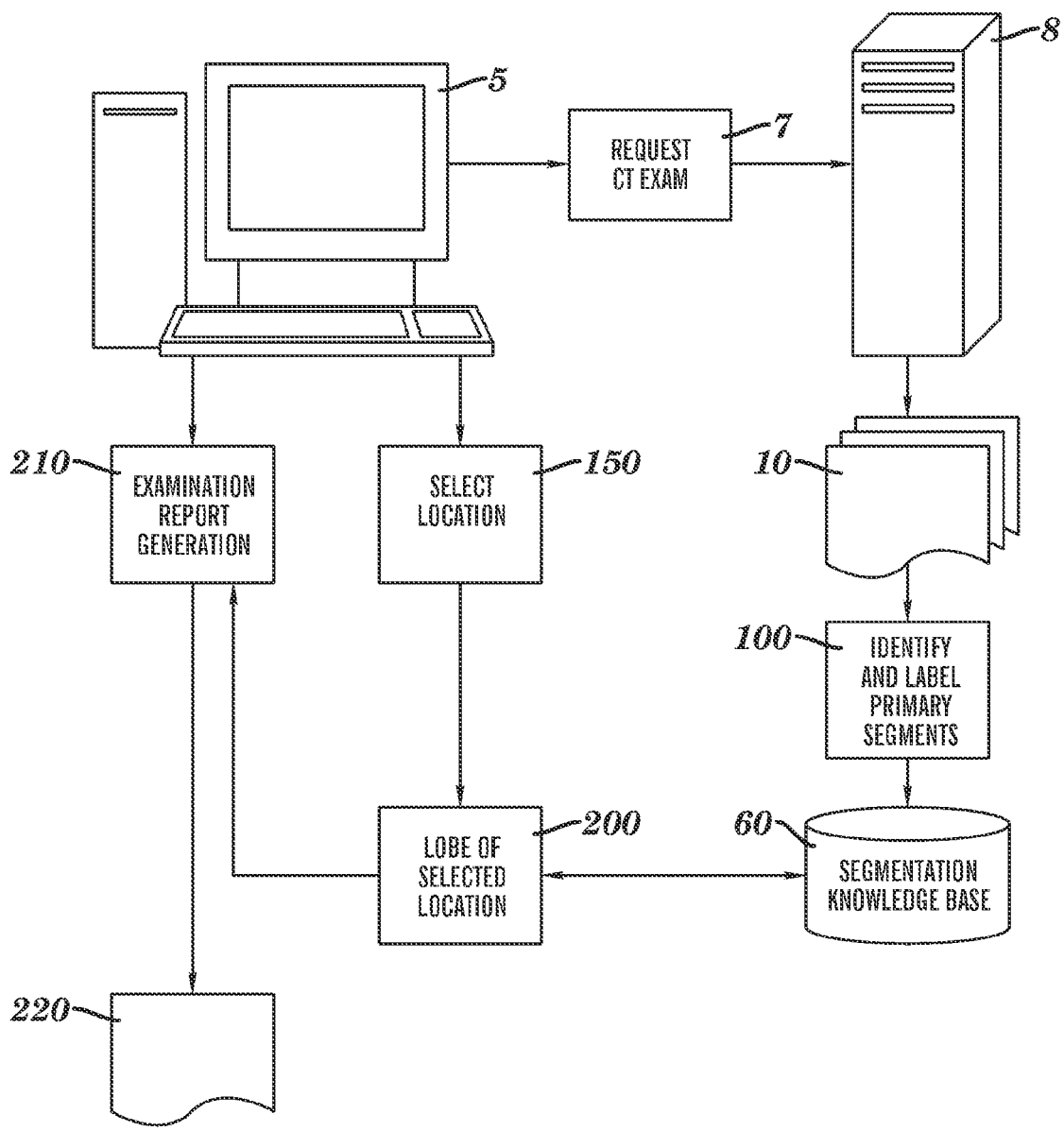
FIG. 1 is a high-level flow diagram of the embodiments that generates medical reports using anatomical location annotation.

Reference is made to commonly-assigned co-pending U.S. patent application Ser. No. 11/567,857, filed Dec. 7, 2006 entitled ANALYZING LESIONS IN A MEDICAL DIGITAL IMAGE, by Simon et al., the disclosure of which is incorporated herein.

As disclosed in the background above, the embodiments of the pre-sent invention can be applied broadly to anatomical organs and organ systems of interest in cases where there are associated to the organs or systems a hierarchical vessel tree structure that supplies, for example, blood or ambient air with oxygen. Some of the detailed description below will be specified to the case of the human lungs for purposes of concrete illustration. It will be clearly understood by persons skilled in the ordinary art that such specification is performed for teaching purposes only, does not restrict the application of the invention to other qualifying organs or organ systems, nor does such specification preclude the use of the invention in the field of non-human (i.e., veterinary) medicine.

Many medical imaging applications are implemented via a picture archiving and communications systems (PACS). These systems provide a means for displaying digital images acquired by a wide variety of medical imaging modalities such as, but not limited to, projection radiography (x-ray images), computed tomography (CT images), ultrasound (US images), and magnetic resonance (MR images). Each of the above mentioned medical imaging modalities contain a slightly different set of diagnostic information. In particular, CT images are obtained with imaging x-ray emission and when viewed and studied by a radiologist can reveal much detail about a patient's 3-dimensional internal anatomy. Computer algorithm technology can also be applied to medical images to enhance the rendering of the diagnostic information, to detect an abnormal condition, i.e. computer aided detection (CAD), and to make measurements relating to the patient's condition, i.e., computer aided measurement (CAM).

An example of the motivation for the development of the technology described herein relates to the segmentation of abnormal pulmonary lesion tissue from normal pulmonary tissue. An intended usage scenario is as follows. A radiologist reviews a thoracic CT exam on a medical PACS and indicates to the CAM segmentation software the position of a suspected pulmonary lesion. The voxel position indicated represents a seed point assumed to be part of the pulmonary lesion. The CAM segmentation software then identifies the voxels surrounding and contiguous to the seed point that are also associated with the pulmonary lesion. Once the region associated with the pulmonary lesion has been segmented a corresponding volumetric size can be calculated. The lobar location of the lesion also needs to be ascertained. The information about the lesion, such as the volume, is sent to an automatic report generator along with the lobar location of the lesion. The technology advancement of the present invention relates to the particular method of performing the lobar location task in an automated fashion. The discussion that follows presumes that the bronchial tree will be used as the reference anatomical vessel tree. It is explicitly asserted that the pulmonary arterial or venous vessel trees could also be used for this purpose, and that the major steps revealed in the following description would apply analogously in those cases as well.

Flow Chart of the Invention (FIG. 1)

Speaking now without reference to any specific anatomical organ location, we describe the main components of the invention. The data of interest is generally from either a three-dimensional CT or MRI examination. The data is digitally sampled data, typically on a rectilinear grid and a data element is referred to as a voxel. The location of a voxel within the grid is given by a triple of integers, (i,j,k), and a voxel value at (i,j,k) is denoted as v(i,j,k). In the following description the primary image modality will be assumed to be CT and the reference voxel values will be in terms of Hounsfield units (HU). FIG. 1, to which reference is now made, provides a high-level flow diagram of the invention that generates medical reports using anatomical location annotation. The system is comprised of a workstation 5 where a medical professional conducts the diagnosis from a medical image. A request 7 for a particular medical image is made to a device 8 such as a PACS and a medical image 10, such as a CT image stack, is located and made available. The system has two main phases. The first phase 100 segments a portion of both the bronchial tree and the pulmonary vessel tree, and identifies a pulmonary lobe with each branch of the vessel trees. The second phase 200 uses the bronchial and pulmonary vessel trees to identify the lobe to which a specified voxel belongs. Operating with the medical image 10, the first phase 100 identifies, segments, and labels the primary bronchial and vessel segments. The labels will refer to lobar regions of the lung. These segments will include the root and first few levels of the bronchial and vessel trees. The labeling and segmentation maps are written to the knowledge base 60 that is stored in the computer memory depending upon computer capabilities. Module 200 (or second phase) performs the second phase, starting with a specified lesion image location 150. It finds a nearby tubular structure and traces the structure backwards until encountering a known, labeled primary segment, making use of the knowledge base 60. The label of the segment then is used to identify the anatomical location of the lesion in the generated medical report 220 by the report generation module 210. It should be clear to one skilled in the art that the first phase 100 need only be performed once, and multiple applications of the second phase 200 can utilize the same knowledge base 60.

Proceeding now to describe the main components in FIG. 1 in more detail, it will be recognized that some steps of the invention will exhibit significant conceptual differentiation when applied to lesions located in different human organs. For this reason, much of the following description is focused on an assumed target organ for clarity. Descriptions will be made for alternative embodiments of primary vessel segment identification 100. These embodiments demonstrate the wide range of potential implementations that can be encompassed within the teachings of the present invention.

Figure 2:
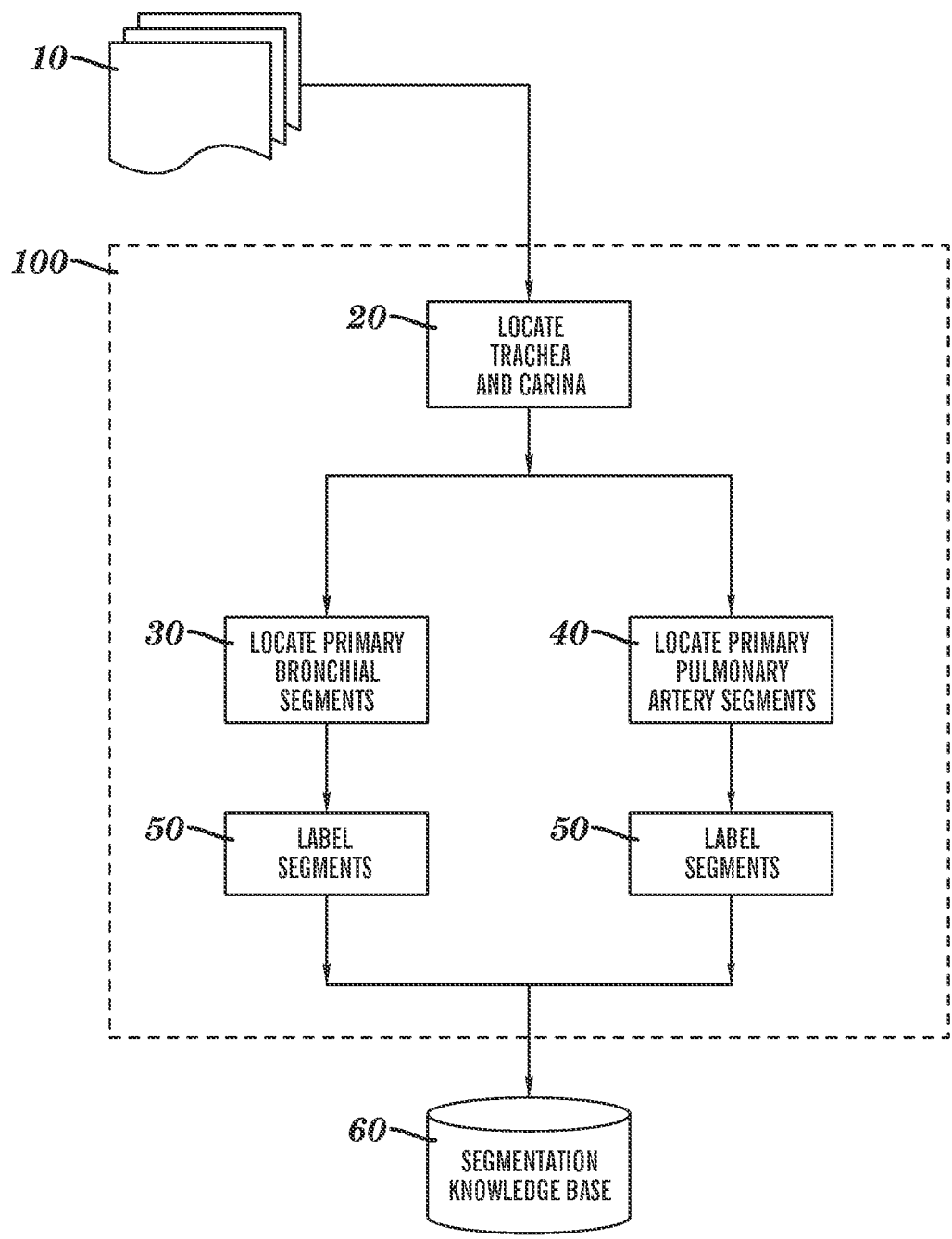
FIG. 2 illustrates a module 100 that identifies and labels the root and low-level vessel segments.

Referring now to FIG. 2, we describe in detail module 100 that identifies and labels the root and low-level vessel segments, in the case when the bronchial airway tree is to be used as a basis for the lobar location of lung lesions. The process consists of the following tasks. The 3D thoracic CT image stack 10 is examined 20 to locate a seed point (the carina) in the trachea (defined as the central single airway connecting the throat with the bronchial tree) or tree root. The next process 30 uses the trachea seed point and grows the airway region along the trachea, past the main bronchial bifurcation, and past the first major branch in the left lung, stopping at the second major branch points; and past the first two major branches in the right lung, stopping at the third major branch points. A similar process 40 uses the trachea seed point to aid in locating a voxel in the pulmonary artery. This is accomplished using a medial axis model of the aorta and pulmonary artery as described by Kitasaka (see Kitasaka, et. al., in "Automated Extraction of Aorta and Pulmonary Artery in Mediastinum from 3D Chest X-ray CT Images without Contrast Medium," Proceedings of SPIE, Vol. 4684, 2003, pp 1496-1506). From that voxel the pulmonary artery is segmented past the main arterial bifurcation, and past the first major branch in the left lung, stopping at the second major branch points; and past the first two major branches in the right lung, stopping at the third major branch points. The vessel segments previously segmented 30 and 40 are labeled using process 50 according to lung lobe. Segmentation and labeling results are stored in the primary vessel segmentation knowledge base 60.

Figure 3:
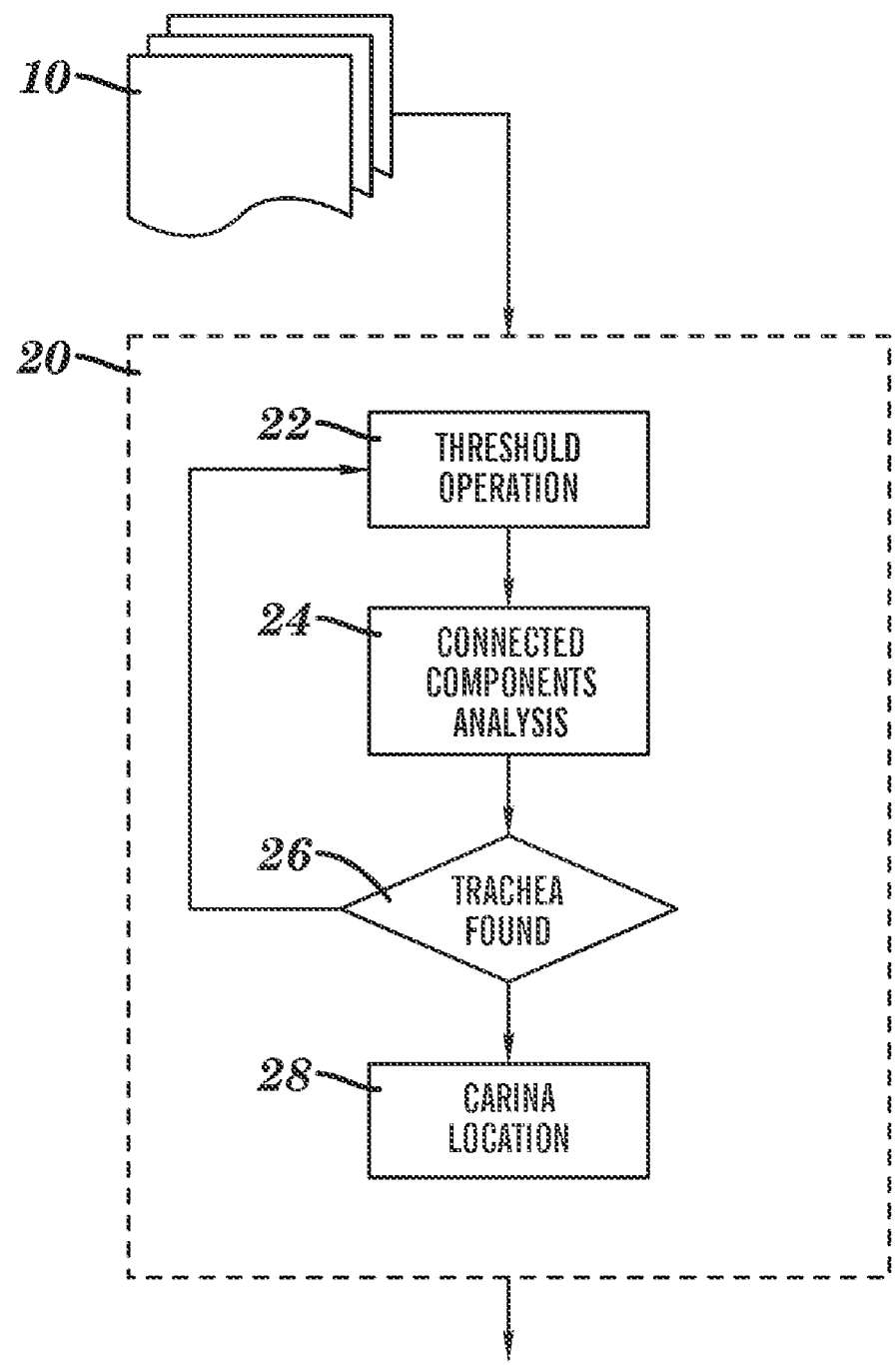
FIG. 3 shows a method of finding a seed point.

Referring to FIG. 3, for a more detailed description of the method to find a seed point contained in the trachea 20. Standard targeting heuristics for thoracic CT images ensure that the trachea will be imaged in the left/right center of the upper-most (closest to head) slices of the 3D images. The thorax exhibits very strong image contrast relative to the surrounding soft tissue due to its large, air-filled lumen. First, segmenting module 22 performs a binary threshold operation on the CT image 10 in which all voxels with CT intensity less than $AIR_{max}$ are transformed to binary one (foreground [FG]) and voxels with intensity greater than or equal to the threshold are transformed to binary zero (background [BG]). A typical value for $AIR_{max}$ is at most 800 HU. The segmentation step performed by module 22 reliably includes in the FG much of the clear lung region as well as the trachea and main bronchial branches. Next, connected components module or process 24 performs a two-dimensional connected components analysis of the segmentation image using methods well known in the art on a slice-by-slice basis starting from the top slice. The results of the component analysis for each slice are examined in turn by decision module or process 26 until the trachea is found, at which time the slice-by-slice search of modules 24 & 26 is terminated, and the trachea is declared located. Decision module 26 reasons as follows. It searches for any connected component that meets all of the following criteria: (1) the geometric centroid of the component must reside within a vertical median strip centered left-right in the image slice; (2) the component size, in pixels must fall within an acceptable range with a given minimum and maximum size. If such a component is found in a slice, then it is identified as the trachea, and the search is terminated; otherwise, the search continues with the next slice in the caudal direction. The width of the vertical median strip is referenced to the image resolution by setting it to an acceptable fraction of the overall image width in pixels, e.g. one-fifth. The minimum and maximum allowed tracheal sizes are referenced to the image resolution by setting them to fractions of the total pixel count in the image slice, e.g., 0.002 and 0.01. If the trachea has been found, then seed point selection module 28 picks a suitable pixel in the trachea component as a seed point. The preferred point is the carina position, which is the first bifurcation point of the trachea. This point can be located by searching down the trachea in successive slices beginning in slices where the trachea has a single connected component and locating the slice and voxel where the two components of the trachea first appear (see Kitasaka, et. al., in "Automated Extraction of Aorta and Pulmonary Artery in Mediastinum from 3D Chest X-ray CT Images without Contrast Medium," Proceedings of SPIE, Vol. 4684, 2003, pp 1496-1506).

Figure 4:
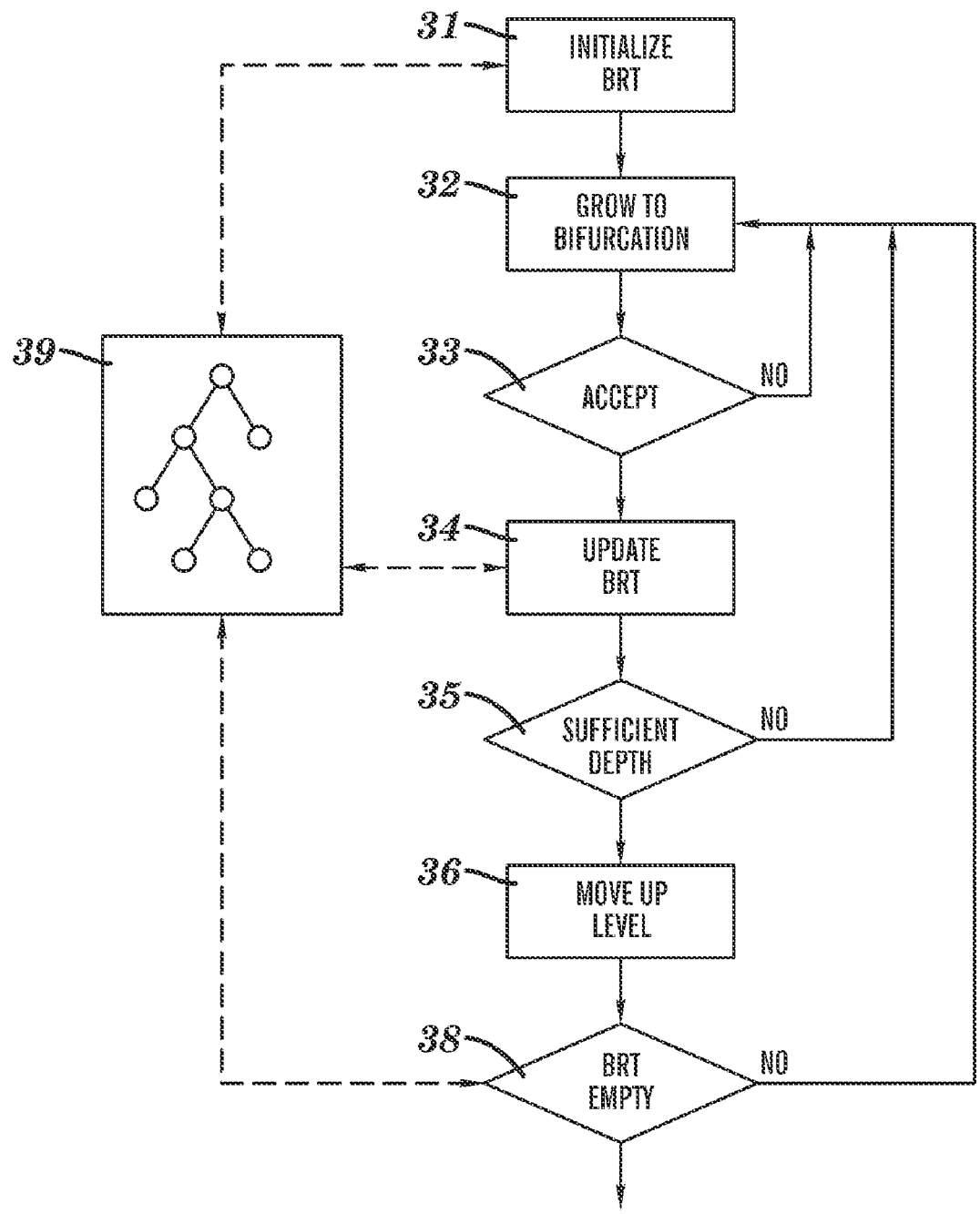
FIG. 4 shows the actions of airway segmenting.

Referring now to FIG. 4, the actions of airway segmenting module 30 from FIG. 2 are described in detail. The method uses a binary recursive tree (BRT) 39 to control the search for the first levels of the bronchial tree. BRTs are well known data structures in computer science (see Sedgewick, Algorithms in C, third edition, Addison-Wesley, 1998, pp 187-250.) Using a BRT, the method initializes the tree 31 and then 32 is used to grow a contiguous section of vessel until the next bifurcation is encountered, at which point the region growing or segmentation stops, and vessel segment auditing module 33 examines the result of the segmentation to decide whether to accept or reject the segment. The task of decision module 33 is facilitated by the fact that only the first two or three levels of the vessel tree require segmentation. These tree segments are quite large in diameter and of predictable length. For this reason, module 33 can assess each segment by ensuring that the average segment diameter, in real world dimensions, falls within the expected range of values for that segment based on the manual measurement performed on a number of human-analyzed training examples. A similar reasoning applies to an assessment of the length of each vessel segment. Any segment that fails the assessments is rejected as a segment and removed from the on-going segmentation. When a segment is rejected, then the apparent bifurcation that established the beginning of the segment was spurious. Such spurious bifurcations are conceptually removed from the growing tree structure, and appropriate adjustments to the branching level numbers of downstream branches are performed. If a branch is accepted the BRT is updated 34 in that two or more branches need to be followed, though only a single such branch at a time can be followed in sequential fashion. The process continues until a sufficient number of bifurcations have been encountered 35 with three such bifurcations typically being adequate. Once this has occurred the tree is traversed and an encountered, but not fully explored branch is processed by moving up the BRT to a higher level 36. This processing continues until such time as the BRT no longer has unexplored branches 38.

The segmentation of pulmonary artery segments 39 is similar to the bronchial segments and so will not be described in detail; however, an additional requirement to locate the pulmonary artery is necessary and this is done using an active shape model of the pulmonary arch.

Module 50 in FIG. 2 performs the labeling of the initial vessel tree segments in the graphical representation of the primary vessel tree produced by modules 30 and or 40. In the following description the term vessel will refer to either the bronchial tree or the pulmonary vascular tree. A topology-preserving skeletonization is applied to the segmented vessel trees produced by module 30 and/or module 40. The goal of this procedure is to create a graph structure that represents the essential topology of the primary vessels. The functioning of this module proceeds in a manner largely independent of the specific anatomy under consideration. The topology of the vessel tree refers to the essential vessel segments and their interconnection relationships. Each vessel segment is represented by its two endpoints, which are connected by a single-pixel wide skeleton path in the image. This skeleton path is located as close as possible to the geometric center of the actual, relatively thick vessel segment in the medical image. In the skeleton, vessel segments are connected at their endpoints in parent-child relationships (such endpoints are called branch points). In addition, the skeleton contains terminal segment endpoints that are not connected to any other vessel segments. The endpoints include the single root of the tree and the many endpoints of the highest branching levels where the segmentation was terminated. The skeleton that is extracted from the image-based vessel segmentation encodes the topology of the anatomical tree. Creation of the vessel tree skeleton follows methods that are well known in the current science of topological image understanding algorithms. An example reference that provides the capabilities described above is C. Min Ma and Milan Sonka, "A Fully Parallel 3D Thinning Algorithm and Its Applications", *Computer Vision and Image Understanding*, 64(3), pp. 420-433, 1996. When once the skeletonization process has completed, the skeleton is converted to a graph representation of the type well known in the computer science literature. Graph nodes represent the skeleton branch points, while graph edges between two nodes represent the segments of the skeleton. A graph representation that encodes the skeleton branch points as nodes exhibits greater tolerance to spurious skeleton segments and branch points than a graph representation in which the nodes encode segments of the skeleton.

Considering now the specific case of lung bronchial airway segmentation, labeling of segments proceeds as follows. It should be recognized that a similar method will perform adequately for the vascular tree as well. The first branch of the tree, starting at the root, is labeled as the trachea. An audit is performed to ensure that the trachea meets a minimum length criterion established from actual measurements in a set of human exemplars. The first two branches are labeled as left and right main bronchus based on the known sides of the patient body in which they are located. The first uppermost branch of the right main bronchus is labeled as the eparterial branch, the lowermost as the hyparterial branch. The latter branch bifurcates into two children that are labeled as the right middle and lower lobe supply branches, based on their head-to-toe spatial ordering in the actual patient image. A similar reasoning process is applied two the twofold lobar division in the left patient lung. The final step performed by the labeling module is to write the labeled segmentation maps to the knowledge base 60. Notice that, while the identities of the labels are inferred from the graph structure that was derived from the skeletonized vessel tree, the labels themselves are mapped into the full, non-skeletonized segmented vessels in a class segmentation map representation. This full representation will be used later to detect the termination criterion of backwards vessel tree tracking for location identification.

Another labeling method 80 is also possible, operating as an alternative to the labeling method 50 described above. This method is outlined in FIG. 6.

Figure 5:
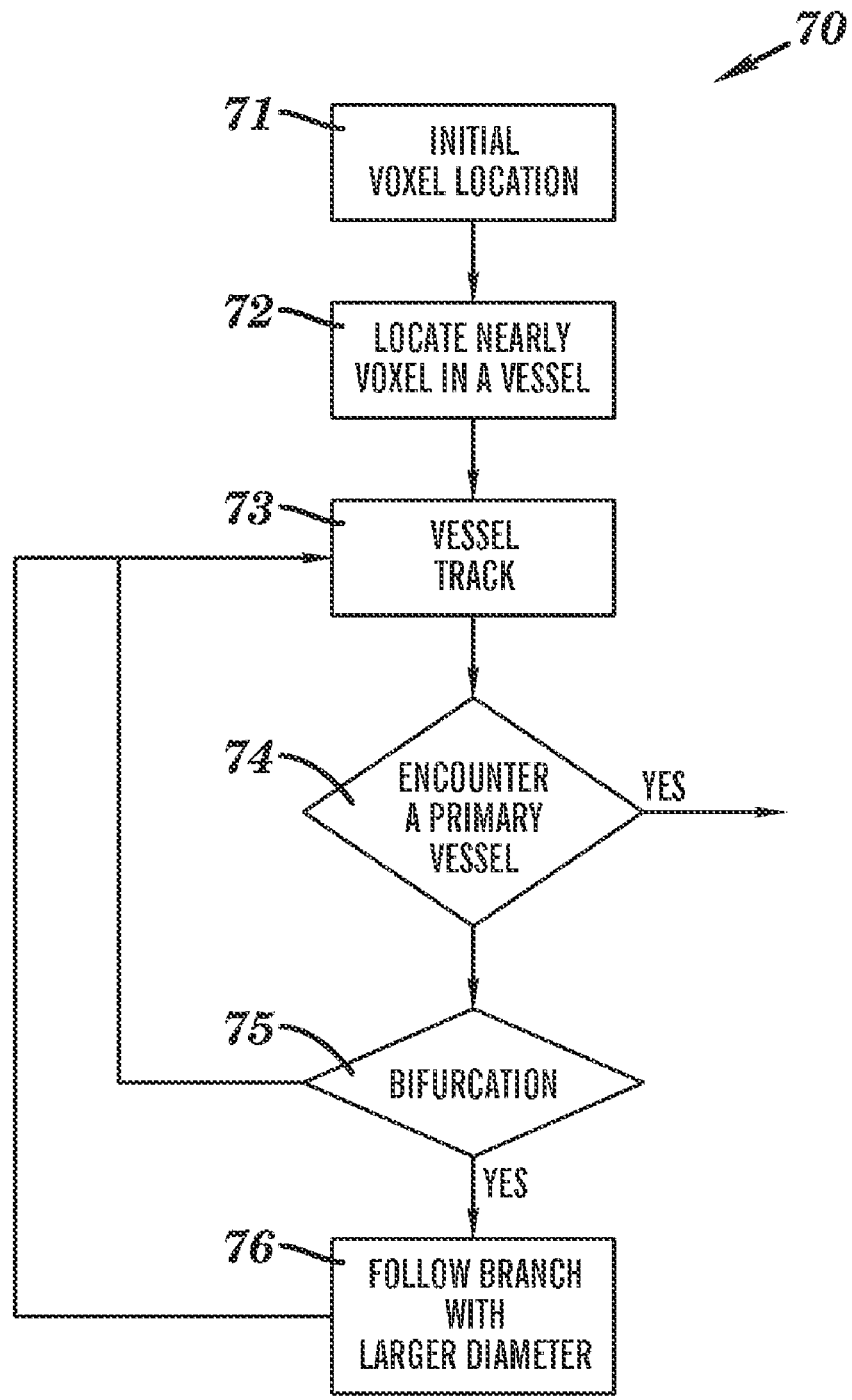
FIG. 5 depicts back tracing to labeled voxels in the knowledge base.

A key component of this method tracks from a selected voxel location, finds a nearby voxel within a vessel, and tracks back until a segmented voxel in the knowledge base 60 has been encountered. This tracking component 70 is depicted in FIG. 5. The method starts with an initial voxel location 71, obtained via an unspecified manner, to be used as a seed point. The selected voxel may not be part of a vessel; hence a process 72 to locate a voxel within a vessel in the vicinity of selected voxel is necessary. A check is made of the seed point to determine the measure of vesselness at the point. If the point is determined not to have a sufficient level of vesselness, then the process does a local search using a search strategy until such a voxel is found in the neighborhood of the seed point. Such a strategy is to select voxels randomly about the seed point using an initial radius and expanding the radius after a prescribed number of unsuccessful trials. An initial radius of 10 voxels is typical, though this is dependent upon the resolution of the CT and other local conditions. If, after a reasonable search has been conducted, no voxel with the desirable characteristics can be found, then another arbitrary voxel seed point is selected in the clear lung field. Assuming that a nearby voxel in a vessel is found, then from this point the vessel is tracked 73 using a minimal path method such as a fast marching method, the other end point of the minimal path being either the carina in the case of the bronchial airway tree or a point near the base of the pulmonary artery tree. Those voxels that are included in the tracking are compared to the knowledge base 60 of voxels identified in the primary segmentation 74. If a voxel stored in the knowledge base has been encountered during the tracking, then the tracking is terminated by module 77, and the labeling of the primary vessel can commence according to the process outlined in FIG. 6. If a voxel stored in the knowledge base has not been encountered during tracking then tracked voxels are checked to determine if a bifurcation in the vessel tracking has occurred 75. If no such bifurcation has occurred then the vessel tracking continues. If a bifurcation has been identified the diameters of the respective branches are measured and the path of the larger is taken 76. The smaller path is abandoned.

Figure 6:
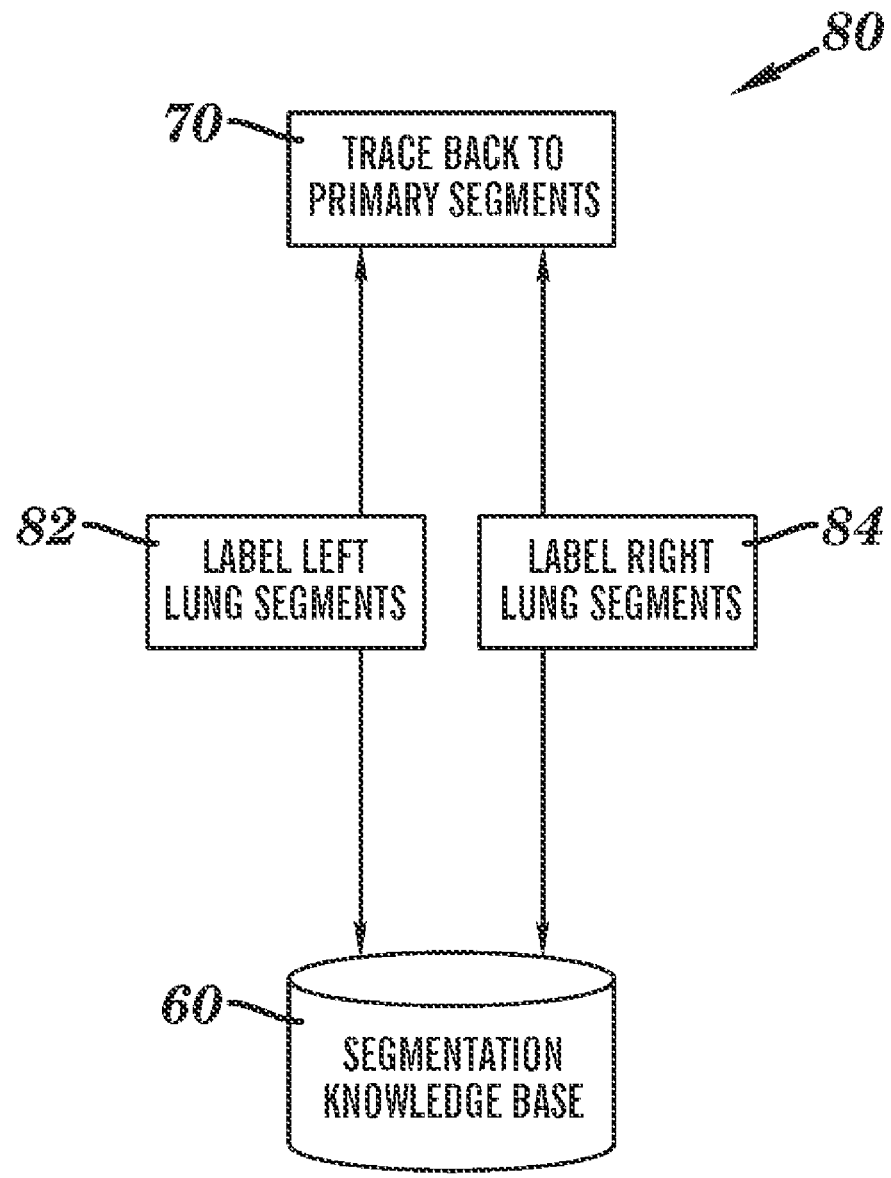
FIG. 6 illustrates an alternative labeling method.

Continuing now with FIG. 6, the vessel labeling 80 uses known constraints on the spatial arrangements of the organ sub-volumes supplied by primary vessel segments to label the segments. It is assumed that the voxels of major vessel segments have been segmented by module 30 but not anatomically labeled. Continuing now with step 82, the known spatial relationship of the upper and lower lobes of the left lung provides ability to label the first two branches descending from the left main bronchus. Starting with the uppermost image slice that contains part of the clear field of the left lung, an arbitrary image voxel is selected. From that voxel, a path is traced backwards, using the methodology for path tracing described above in connection with module 70 of FIG. 5, until the segmentation for a left primary vessel branch is encountered. When the primary vessel segment is encountered, it can be confidently labeled as the upper left main branch. Furthermore, the other branch of the two main left lung branches can be labeled as the lower left main branch without the need to perform a similar tracing from the lowest part of the clear field of the left lung. Labeling of the primary branches of the right lung bronchi by module 84 proceeds in a similar manner except that, due to the three lobes present in the right lung, it is necessary to trace backwards from both upper and lower slices in the right clear lung field. In this case, the two primary vessel branches that are first encountered are labeled as the eparterial right branch and the lower hyparterial main branch, supplying the upper and lower right lungs, respectively. Then, the middle hyparterial main branch can be labeled as being the unique sibling branch to the now identified lower hyparterial main branch. The final step performed by the labeling module is to write the labeled segmentation maps to the knowledge base 60. Notice that, while the identities of the labels are inferred from the backward traces starting from judiciously located initial points in the lung fields, the labels themselves are mapped into the full segmented vessels in a class segmentation map representation.

The description of the above paragraph detailing an alternative method for labeling primary branches of the vessel tree has described particularly the case of the lungs. It will be recognized by those skilled in the art that a similar methodology can be applied to other organs when there are known spatial constraints to the volume regions supplied by the primary associated vessel segments, as in the case of the human liver.

The knowledge base 60 is a companion data volume. The data volume may be implemented in several manners that accomplish the same purpose. The purpose is to store spatial information of the segmentation and labeling previously performed. The data volume is a sub-volume of the initial data volume comprised by the CT stack 10, and is sufficiently large to contain the previously segmented data. In addition to the sub-volume a set of index values 61 is maintained that identify the location of the sub-volume in relation to the initial volume. The elements of the knowledge base are initially set to zero, but will be modified to the label determined in the labeling step 50. Assuming five lobar regions, an index for each lobar region is assigned.

Referring again to FIG. 1, the description of module 200, used for the determination of lesion location, begins here. With the establishment of the knowledge base 60 the location of a voxel, such as a voxel in a lung lesion, is provided by the user 150. Using the method 70 outlined in FIG. 5 paths are traced back to labeled voxels in the knowledge base. The first path tracing uses a minimal path to connect to the carina, and a second path tracing uses a minimal path to connect to a point in the pulmonary artery. One of the two paths will have a smaller overall cost, as the initial voxel location will result in a traced path either in the bronchial system or the arterial system, the reason being that the transition between the two systems will present a large cost that is not borne for paths that remain within the same system. The path with the smaller cost will encounter a labeled voxel in the knowledge base and this label is used to identify the lobar location of the voxel. The lobar identifier is translated into a textual form for inclusion into the diagnostic report 220 via the report generator 210. The location result will be accompanied by other information concerning the lesion as determined by the radiologist or by measurement tools provided by the PACS system.

Alternatively, it may be desired to ensure that the method 70 for tracing back from a seed voxel location to the primary vessel tree segmentation makes use of a specified vessel tree (e.g., either the bronchial tree or the pulmonary arterial tree, selected a priori). In such cases, a test can be performed on the cost of the shortest path traced from the seed location to the root of the specified vessel tree. If the cost exceeds a predetermined threshold $thr_{cost}$, then it can be concluded that the tracing has needed to cross vessel tree boundaries, and that hence the initial vessel voxel, found close to the seed location, was a voxel in a vessel tree other than the desired vessel tree. The tracing is rejected, and the tracing process is repeated after applying a small random perturbation to the seed location. Multiple tracings can be attempted until a tracing occurs that starts with an initial vessel voxel falling within the desired vessel tree, as determined by the threshold test on path cost being successfully satisfied.

Increasing Reliability and Accuracy of the Anatomical Location

Since human anatomy often includes more than one vessel tree associated to an organ, the present invention provides means to increase the reliability or accuracy of anatomical location identification by using the informational redundancy provided by analogous structures. The following description will focus on the specific case of the human lung for illustrative purposes, but a person skilled in the art will recognize that there are other organs that satisfy the condition of association to multiple vessel trees, and that hence the same processing methodologies could be applied to obtain the location of lesions in those organs as well.

Figure 7:
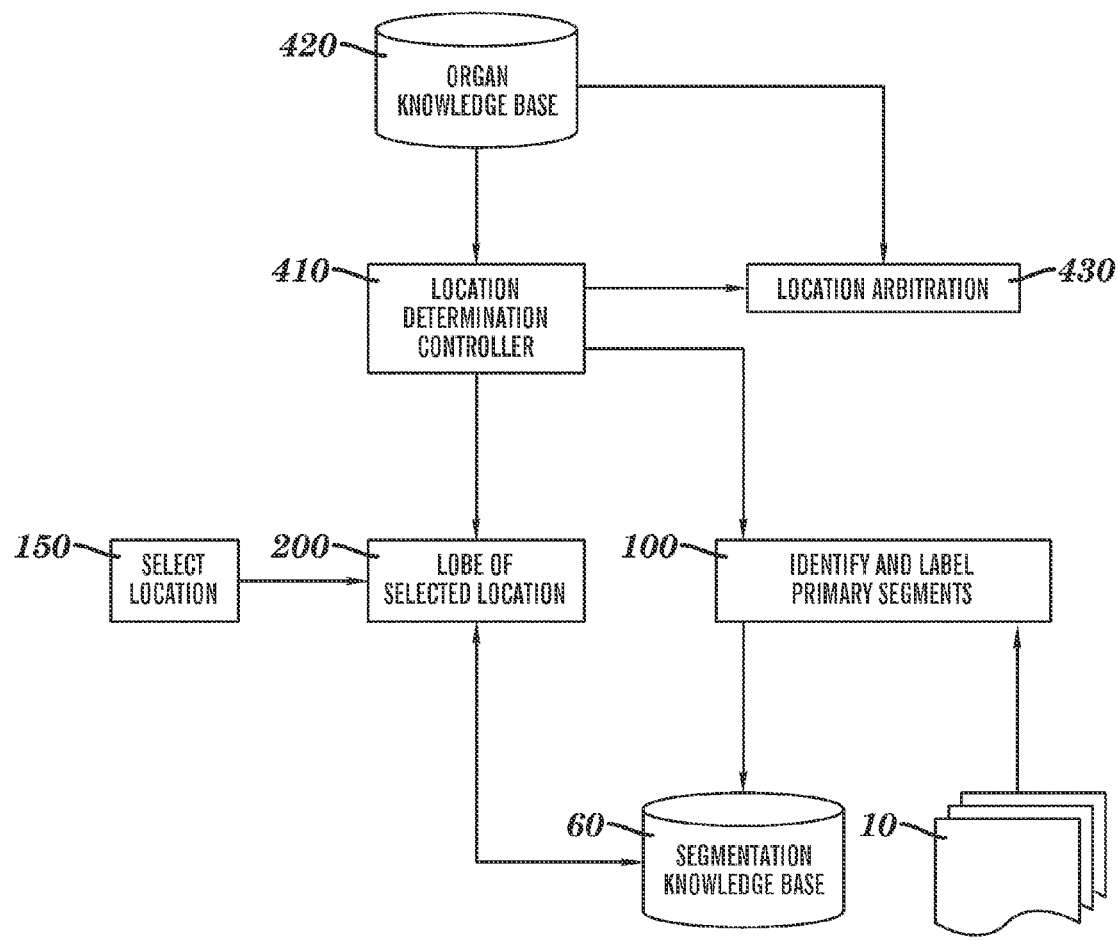
FIG. 7 shows the process of using multiple vessel trees to identify the location of a suspicious lesion.

Referring now to FIG. 7, in order to minimize failure cases and thereby increase the reliability of anatomical lesion labeling, the location determination controller 410 oversees the process of using multiple vessel trees to identify the location of a suspicious lesion. The organ knowledge base 420 encodes, for each applicable organ or organ system target, the identities of vessel trees that can be used to identify a lesion location in that type of organ. Furthermore, the organ knowledge base contains a priori knowledge of the relative reliability of each available vessel tree in view of the knowledge of the type of the medical image 10 and the technical parameters of the image, including use or not of imaging contrast agent. According to the ordering specified in the organ knowledge base, controller 410 invokes, for the most reliable vessel tree, the combination of the primary vessel segmentation module 100 followed by the lesion location determination module 200. The primary vessel segmentation module 100 writes the segmentation information to the segmentation knowledge base 60, whence it is used in the process of lesion location by module 200. Based on the success or failure of the lesion identification by module 200, the location controller 410 will either terminate the location process in the case of successful location, or proceed to repeat the above process in the case of failure, now using the next most reliable vessel tree in place of the prior tree. This iteration continues until either a lesion location is successfully estimated, or until all available vessel trees have failed to permit estimation of the location.

Continuing with FIG. 7, an alternative performance goal for the invention is to provide the most accurate possible anatomical location of a suspect lesion. In this case, accuracy can be increased by performing labeling independently using multiple vessel trees associated to an organ or organ system. To obtain maximum accuracy, the location determination controller 410 queries the organ knowledge base to find all available vessel trees applicable to the lesion's organ location. The controller invokes the combination of the primary vessel segmentation module 100 followed by the lesion location determination module 200 operating on each of the vessel trees. The results of these operations will be a plurality of estimates of the anatomical location of the lesion of interest. These location estimates will be processed by location arbitration module 430. If the estimates are all in harmony with respect to major anatomical sub-divisions, then arbitration module 430 declares the lesion located with high confidence. If the estimates display divergence of location, then the arbitration module 430 selects the location estimate produced using the highest reliability vessel tree, relying on the organ knowledge base 420 for this determination. In this case, the lesion is identified as located, but with lower confidence.

The processes discussed herein can be performed in a system as depicted in FIG. 1 or within a computer system such as a desktop or server type computer system where the report is output via a printer or stored for later retrieval and review on a display of the computer system.

PARTS LIST

5—workstation
7—request
8—device
10—medical image or image stack
0—examine stack
22—perform thresholding
24—analyze connectedness
26—decision
28—seed point selection
30—locate arterial segments
31—initialize tree
32—grow bifurcation
33—access segment
34—update tree
35—depth sufficient
36—move up tree
38—BRT empty
39—segment tree
40—locate bronchial segments
50—label operation 60—knowledge base
70—tracking component
71—set initial location
72—locate nearby voxel of a vessel
73—track vessel
74—identify segment
75—bifurcation
76—follow larger branch
80—vessel labeling process
82—label left lung segments
84—label right lung segments
100—first phase
150—specified lesion image location
200—second phase
210—report generation module
220—generated medical report
410—controller
420—organ knowledge base
430—location arbitration module

The invention claimed is:

1. A method for anatomical labeling, comprising:
segmenting a vessel tree anatomical structure starting from an initial image point;
labeling vessel segments of the vessel tree anatomical structure with segment labels based on anatomical knowledge to create an anatomical model;
receiving an image point having a location in an image of an anatomical structure;
locating, from the image point, a vessel structure in the vessel tree anatomical structure in proximity to the image point;
tracking, using the anatomical model, along the vessel tree anatomical structure in a direction towards a root of a parent vessel tree until one of the segment labels is encountered in the anatomical model; and
assigning the one of the segment labels from the anatomical model as an anatomical location label of the image point.

2. The method as recited in claim 1, wherein the image point identifies a location of an anatomical lesion in the image.

3. The method as recited in claim 1, wherein segmenting and labeling of the vessel tree anatomical structure are confined to beginning parts of the vessel tree where segmenting and labeling can be performed with a highest accuracy.

4. The method as recited in claim 1, wherein segmenting and labeling are performed for two or more parallel vessel tree anatomical structures associated with an organ.

5. The method as recited in claim 4, wherein an autonomously-identified hierarchical ranking of the reliability of vessel tree anatomical models with labeling thereof is used to assign the anatomical location label to the image point, according to:
assigning the anatomical location label of a vessel segment from the most reliable anatomical model as the label of the image point, if it is possible to track along a vessel structure from the image point in the direction towards the root of the vessel tree until a prior labeled vessel segment is encountered, the success of the tracking being assessed by:
a) randomly searching around the image point until a vessel is found;
b) finding a minimum-cost path back to the root of the anatomical model by measuring a cost function along a path of tracking and summing a total path cost;
c) rejecting the tracking operation as failed if the total path cost exceeds a fixed threshold $thr_{cost}$, otherwise accepting the tracking operation by assigning the label of the vessel segment and terminating the labeling process; and
d) repeating (a)-(c), if necessary, a fixed number of times to initiate the tracking from different starting vessel points until success occurs;
repeating, if the labeling operation using the first anatomical model and vessel tree did not complete successfully, the vessel structure tracking operation using the next most reliable anatomical model and vessel tree until a prior labeled vessel segment is encountered, and assigning the label of the vessel segment if the tracking operation in successful; and
repeating this labeling and tracking operation using all segmented vessel trees in decreasing priority order.

6. The method as recited in claim 4, wherein a user-identified hierarchical ranking of the reliability of vessel tree anatomical models with labeling thereof is used to assign the anatomical location label to the image point, according to:
assigning the label of a vessel segment from a user-identified most reliable anatomical model as the anatomical location label of the image point, if it is possible to track along a vessel structure from the user-specified image point in the direction towards the root of the vessel tree until a prior labeled vessel segment is encountered, the success of the tracking being assessed by:
a) randomly searching around the user-specified image point until a vessel is found;
b) finding a minimum-cost path back to the root of the anatomical model by measuring a cost function along a path of tracking and summing a total path cost;
c) rejecting the tracking operation as failed if the total path cost exceeds a fixed threshold $thr_{cost}$, otherwise accepting the tracking operation by assigning the label of the vessel segment and terminating the labeling process; and
d) repeating (a)-(c), if necessary, a fixed number of times to initiate the tracking from different starting vessel points until success occurs;
repeating, if the labeling operation using the first anatomical model and vessel tree did not complete successfully, the vessel structure tracking operation using the user-identified next most reliable anatomical model and vessel tree until a prior labeled vessel segment is encountered, and assigning the label of the vessel segment if the tracking operation in successful; and
repeating this labeling and tracking operation using all segmented vessel trees in user-identified decreasing priority order.

7. The method as recited in claim 4, wherein a plurality of vessel tree anatomical models with labeling thereof are used to assign the anatomical location label to the image point with increased reliability, according to:
assigning the label of a vessel segment from each anatomical model to the image point, if it is possible to track along a vessel structure from the image point in the direction towards the root of the vessel tree until a prior labeled vessel segment is encountered, the success of the tracking being assessed by:
a) randomly searching around the user-specified image point until a vessel is found;
b) finding a minimum-cost path back to the root of the anatomical model by measuring a cost function along the path of tracking and summing the total path cost;
c) rejecting the tracking operation as failed if the total path cost exceeds a fixed threshold $thr_{cost}$, otherwise accepting the tracking operation by assigning the label of the vessel segment and terminating the labeling process; and
d) repeating (a)-(c) if necessary a fixed number of times to initiate the tracking from different starting vessel points until success occurs; and
accumulating a set of anatomical labels, one from each anatomical model.

8. The method as recited in claim 7, wherein the image point is assigned the anatomical label derived from all anatomical models, when the anatomical models unanimously provide the same label.

9. The method as recited in claim 7, wherein the autonomously-identified hierarchical ranking of the reliability of vessel tree anatomical structures with labeling thereof is used to assign the anatomical location label to the image point, where furthermore the anatomical models fail to provide an unanimous label for the point, in which case the label from the highest reliability vessel tree is assigned to the image point; and the system user is notified of the lack of unanimous labeling.

10. The method as recited in claim 7, wherein an user-specified hierarchical ranking of the reliability of vessel tree anatomical structures with labeling thereof is used to assign an anatomical label to the image point, where furthermore the anatomical models fail to provide an unanimous label for the image point, in which case the label from the user-specified highest reliability vessel tree is assigned to the image point; and a system user is notified of the lack of unanimous labeling.

11. The method as recited in claim 1, wherein the initial image point is automatically determined.

12. The method as recited in claim 1, wherein tracking includes:
measuring a cost function along a path of tracking and summing a total path cost; and
rejecting the tracking as failed if the total path cost exceeds a fixed threshold $thr_{cost}$.

13. A method for labeling a user-specified image point with an anatomical label, comprising:
segmenting a vessel tree anatomical structure starting from an autonomously determined initial image point;
labeling the vessel segments of the vessel tree segmentation with segment labels based on a priori anatomical knowledge, thereby creating an anatomical model;
receiving a user-specified image point having a location from a user and locating a nearby vessel structure, wherein the process of locating a vessel nearby to a user-specified seed point comprises randomly searching around the image point location until a vessel is found;
tracking along the vessel structure in a direction towards a root of a parent vessel tree until a prior labeled vessel segment is encountered in the anatomical model; and
assigning the label of the encountered prior labeled vessel segment from the anatomical model as an anatomical location label of the user-specified image point.

14. A method for labeling a user-specified image point with an anatomical label, comprising:
segmenting a vessel tree anatomical structure starting from an autonomously determined initial image point;
wherein segmenting the vessel tree anatomical structure comprises:
transforming image pixels using a threshold;
examining image slices one slice at a time until a location and size of a connected component match anatomical criteria to identify the root of the vessel tree anatomical structure; and
creating a binary recursive tree starting from the root having a predetermined number of bifurcations by examining image slices one slice at a time and growing a vessel segment responsive to known anatomical vessel dimensions;
labeling the vessel segments of the vessel tree segmentation with segment labels based on a priori anatomical knowledge, thereby creating an anatomical model;
receiving a user-specified image point having a location from a user and locating a nearby vessel structure;
tracking along the vessel structure in a direction towards a root of a parent vessel tree until a prior labeled vessel segment is encountered in the anatomical model; and
assigning the label of the encountered prior labeled vessel segment from the anatomical model as an anatomical location label of the user-specified image.

15. The method as recited in claim 14, wherein labeling the vessel tree anatomical structure is further comprising:
creating a tree graph from thin skeletons of the vessel segments; and
labeling segment branches of the graph using a priori anatomical knowledge.

16. The method as recited in claim 14, wherein the anatomical model corresponds to a model of a pair of lungs and wherein labeling the vessel tree anatomical structure further comprises:
starting with an uppermost image slice that contains part of a clear field of a left lung of the pair of lungs, selecting an arbitrary image voxel, and tracing a path backwards until a segmentation for a left primary bronchial vessel branch is encountered, which is then labeled as an upper left main branch;
labeling an other branch of two main left lung bronchial branches as a lower left main branch;
starting with the uppermost image slice that contains part of a clear field of a right lung of the pair of lungs, selecting an arbitrary image voxel, and tracing a path backwards until the segmentation for a right primary bronchial vessel branch is encountered, which is then labeled as a right eparterial branch;
starting with a lowermost image slice that contains part of the clear field of a right lung, selecting an arbitrary image voxel, and tracing a path backwards until the segmentation for a right primary bronchial vessel branch is encountered, which is then labeled as a right lower hyparterial branch; and
labeling a remaining middle right primary bronchial vessel branch as a right middle hyparterial branch.

17. A system, comprising:
a memory storing instructions;
a processor configured to execute the instructions to perform a method comprising:
segmenting a vessel tree anatomical structure starting from an initial image point;
labeling vessel segments of the vessel tree anatomical structure with segment labels based on anatomical knowledge, to create an anatomical model;
receiving an image point having a location in an image of an anatomical structure;
locating, from the image point, a vessel structure in the vessel tree anatomical structure in proximity to the image point;
tracking, using the anatomical model, along the vessel tree anatomical structure in a direction towards a root of a parent vessel tree until one of the segment labels is encountered in the anatomical model; and
assigning the one of the segment labels from the anatomical model as an anatomical location label of the image point;
a display displaying a report showing the anatomical location label for the image point.

* * * * *